United States Patent Office 2,784,320
Patented Mar. 5, 1957

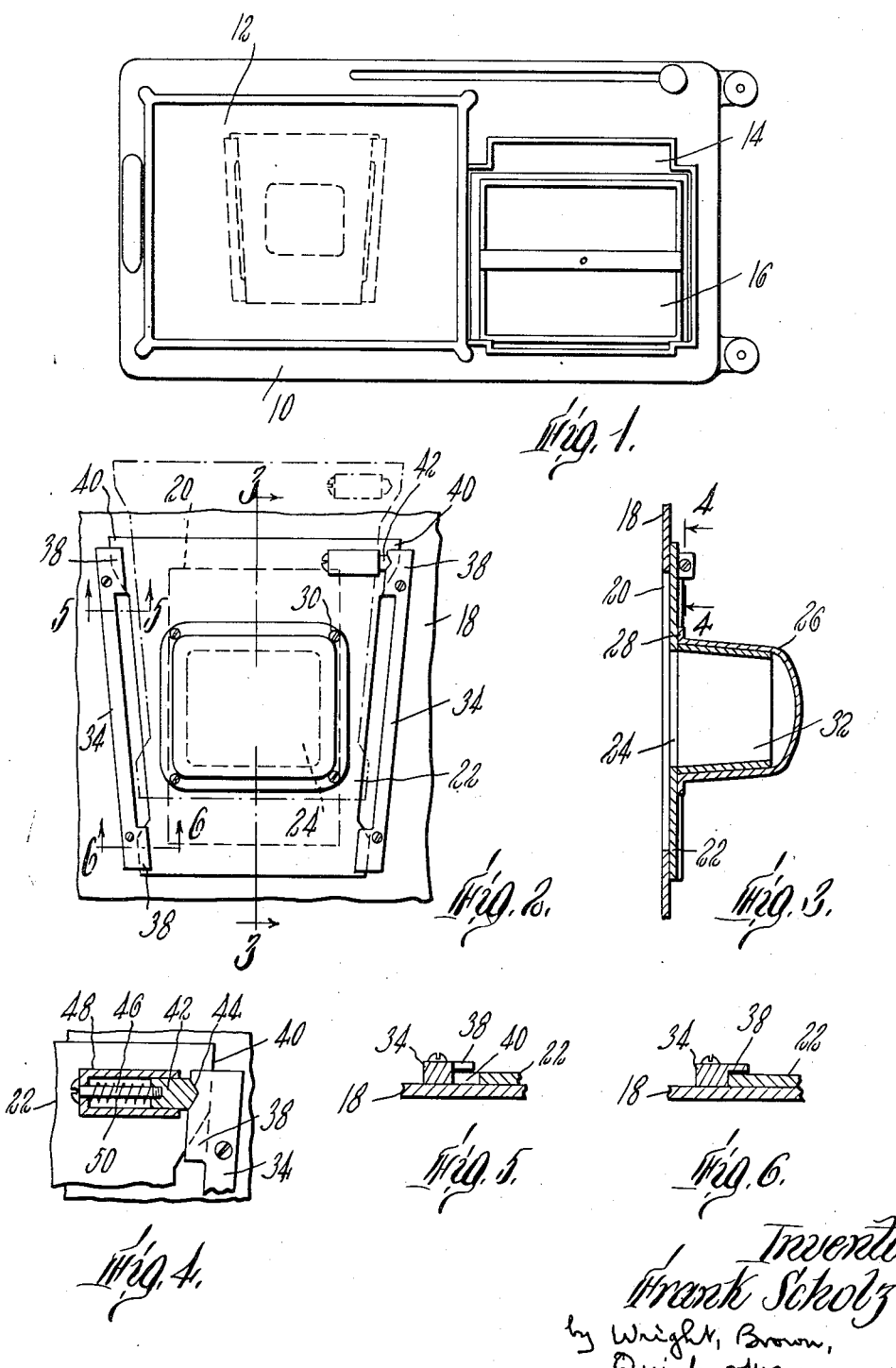

2,784,320

SPOT-FILM DEVICE FOR X-RAY MACHINES

Frank Scholz, South Sudbury, Mass.

Application September 24, 1953, Serial No. 382,087

9 Claims. (Cl. 250—105)

This invention relates to an improved spot-film device for X-ray machines, said device including an improved compression cone. The cone is mounted on a plate which can easily be attached to or detached from the frame which carries the fluoroscopic screen.

It is an object of the invention to provide a cone which is superior in performance to cones which have heretofore been employed, and which can quickly and easily be mounted for use or removed from the device in the darkness in which the operator of the machine must usually carry on. For this purpose I form the improved compression cone of thermoplastic sheet material which can be readily shaped when sufficiently heated but which is tough and stiffly resilient when at room or body temperature and which is very transparent to X-rays. For example, a plastic substance having these properties is sold under the name of "Boltaron" and is a composition of Buta-S, Buta-N and styrene.

To protect the fluoroscopic radiographic image from stray X-rays while using the cone, the sides of the cone are preferably lined with sheet lead. The cone and its lining are secured to a keystone-shaped plate having an aperture which registers with the base of the hollow compression cone. This plate is constructed to be readily mounted on and detached from the back of the frame.

For a more complete understanding of the invention reference may be had to the following description thereof and to the drawing, of which—

Figure 1 is a front view of a frame having a fluoroscopic screen and a carrier for a cassette;

Figure 2 is a fragmentary rear view of the frame, showing a removable compression cone embodying the invention;

Figure 3 is a section on the line 3—3 of Figure 2;

Figure 4 is a section on the line 4—4 of Figure 3, but on a larger scale;

Figure 5 is a section on the line 5—5 of Figure 2, on a larger scale; and

Figure 6 is a section on the line 6—6 of Figure 2, on a larger scale.

Figure 1 is a front view of a spot-film device for X-ray machines, a similar device being described and illustrated in my Patent No. 2,560,782, granted July 17, 1951. The device includes a main frame 10 which is rectangular. The frame has a large opening containing a fluoroscopic screen 12. In the frame is a carriage 14, a small portion of which appears in Figure 1. The carriage is adapted to hold a cassette 16 and to carry the cassette edgewise to and from the exposure opening containing the fluoroscopic screen 12. At the rear of the opening is removably mounted a back plate 18 which is substantially opaque to X-rays. This plate has a rectangular aperture 20 which is approximately the size and shape of half of the cassette 16 so that the film within the cassette can be exposed to the X-rays one half at a time. If a single exposure of the entire film is desired, the back plate 18 is removed.

Removably mounted on the plate 18 is an auxiliary plate 22 which covers the aperture 20 and is substantially opaque to X-rays. The auxiliary plate has a hole 24 therein over which is mounted a compression cone 26. The hole 24 is preferably rectangular with or without rounded corners, the area of the hole being substantially one quarter of that of the film carried by the cassette. Four exposures on four quarters of the film thus utilize practically the whole area of the film. Furthermore, the rectangular shape matches the cross-sectional shape of a beam of X-rays projected through a diaphragm having a rectangular aperture. The usual compression cone is a thin metal cylinder having a rounded end adapted to be pressed against the body of a patient for an X-ray photograph of the portion of the patient in line with the compression cone. According to the present invention the cone has flat sides with rounded corners to fit over the rectangular hole 24, these sides converging slightly and merging into a rounded top, the entire cone being in the form of an inverted cup. The inclination of the side walls of the cone is such as to permit them to coincide with the boundary planes of the beam of X-rays projected toward it through the diaphragm, the beam being of pyramidal shape. The compression cone 26 is preferably made from a sheet of synthetic plastic material which is resilient, tough, durable and transparent to X-rays. A material of this kind is commercially available under the name "Boltaron" and is a composition of Buta-S, Buta-N and styrene. This material is thermoplastic so that the cone is readily molded to desired shape when the material is sufficiently heated. At room temperature or body temperature the material is stiffly resilient. In shaping the cone 26, a narrow flange 28 may be formed around the rim to receive screws 30 or other means by which the cone is secured to the auxiliary plate 22. The side walls of the cone are lined with lead or other material which is opaque to X-rays. This lining sharply defines the boundaries of the field, improves definition and protects the radiograph from secondary radiation.

In order to facilitate the mounting of the auxiliary plate 22 in the darkness in which the operator usually works, holding means are provided by which it can quickly and easily be mounted and placed. For this purpose the auxiliary plate 22 is preferably of the general shape of a keystone, the side edges converging. A pair of hold-down elements 34 are mounted on the rear face of the back plate 18, these elements being on opposite sides of the aperture 20. The elements are arranged to converge at the same angle as the side edges of the auxiliary plate 22. Each of the elements 34 is provided with one or more flanges or lips 38 arranged to overlap portions of the side margins of the auxiliary plate 22. As shown, each of the hold-down elements has two overlapping lips 38, these being located adjacent to the ends of the hold-down elements. If desired, the mid portions of the side edges of the auxiliary plate 22 may be offset inward so as to form ears 40 at the corners of the auxiliary plate, these ears projecting laterally from the sides of the plate and engaging under respective lips 38. This makes it possible to mount the auxiliary plate on the back plate with a minimum of endwise movement. In order to hold the auxiliary plate releasably in its position, a spring pressed latch 42 is mounted on the auxiliary plate in a position to enter a notch 44 in one of the hold-down members 34. This latch may conveniently be mounted on a stem 46 which projects slidably through the end of the cylindrical casing 48 mounted on the plate, a compression spring 50 being located within the container to press against the latch 42. The notch 44 has sloping sides to be fitted by the end of the latch 42 so that the latch will snap into and out of the notch as the auxiliary plate is pushed into or out of its position on the plate 18.

I claim:

1. In a spot-film device for X-ray machines which includes a frame having an opening, a carriage in said frame movable to carry a cassette edgewise into and out of said opening, and a fluoroscopic screen in said opening; a back plate substantially opaque to X-rays mounted in said opening behind said fluoroscopic screen, said plate having a rectangular aperture therein, an auxiliary plate of substantially opaque material on the back plate covering said aperture, said auxiliary plate having a hole therethrough, a compression cone mounted on said auxiliary plate and covering said hole, and means releasably holding the auxiliary plate in place on the back plate.

2. A device as in claim 1, the aperture in said back plate being generally rectangular with a length and width approximately half the length and width respectively of a cassette.

3. A device as in claim 1, said holding means comprising ears projecting laterally from the side edges of said auxiliary plate, and hold-down elements mounted on the back plate to overlap said ears when said plates are assembled.

4. A device as in claim 1, said auxiliary plate having converging side edges, said holding means including elongated hold-down elements mounted on the back plate to overlap portions of said side edges when the plates are assembled.

5. A device as in claim 4, said holding means also including a notch in one of said hold-down elements and a spring pressed latch element mounted on said auxiliary plate and normally engaged in said notch.

6. A device as in claim 3, said auxiliary plate being generally keystone-shaped.

7. A device as in claim 1, said compression cone comprising a single sheet of X-ray transparent plastic molded to an inverted cup-shape, the edges of the cup being secured to said auxiliary plate along the edges of the hold in the auxiliary plate.

8. A device as in claim 7, the sides of said compression cone having an X-ray-opaque lining.

9. A compression cone for a spot-film device, comprising a stiffly resilient sheet of thermoplastic X-ray-transparent material molded to an inverted cup-shape with four side walls and a rounded top, said cone having a substantially rectangular transverse section, and a lining of X-ray-opaque material within said side walls.

References Cited in the file of this patent

UNITED STATES PATENTS

| 1,352,198 | MacLagen | Sept. 7, 1920 |
| 1,854,810 | Wappler | Apr. 15, 1930 |
| 2,144,114 | Lehoczky | Jan. 17, 1939 |
| 2,184,962 | Scholz | Dec. 26, 1939 |

FOREIGN PATENTS

| 351,651 | Germany | Apr. 9, 1921 |